(12) United States Patent
Moravec et al.

(10) Patent No.: US 8,756,795 B1
(45) Date of Patent: Jun. 24, 2014

(54) METHOD FOR MANUFACTURING A READ HEAD HAVING CONDUCTIVE FILLER IN INSULATED HOLE THROUGH SUBSTRATE

(75) Inventors: Mark D. Moravec, Lamlukka (TH);
Subrata I Gusti Made, Bangpa-In (TH);
Santi Pumkrachang, Bangkok (TH)

(73) Assignee: Western Digital (Fremont), LLC, Fremont, CA (US)

( * ) Notice: Subject to any disclaimer, the term of this patent is extended or adjusted under 35 U.S.C. 154(b) by 274 days.

(21) Appl. No.: 13/426,438

(22) Filed: Mar. 21, 2012

Related U.S. Application Data

(62) Division of application No. 12/612,575, filed on Nov. 4, 2009, now Pat. No. 8,164,858.

(51) Int. Cl.
| | | |
|---|---|---|
| *G11B 5/127* | (2006.01) | |
| *H04R 31/00* | (2006.01) | |
| *G11B 5/187* | (2006.01) | |
| *G11B 5/265* | (2006.01) | |
| *G11B 5/48* | (2006.01) | |
| *G11B 7/00* | (2006.01) | |
| *G11B 7/005* | (2006.01) | |
| *G11B 7/22* | (2006.01) | |

(52) U.S. Cl.
CPC ............ *G11B 5/127* (2013.01); *G11B 5/1272* (2013.01); *G11B 5/187* (2013.01); *G11B 5/2651* (2013.01); *G11B 5/48* (2013.01); *G11B 7/00* (2013.01); *G11B 7/005* (2013.01); *G11B 7/22* (2013.01)
USPC .................. 29/603.14; 29/603.07; 29/603.13; 29/603.15; 29/603.16; 29/603.18; 360/234.5; 360/234.6; 360/234.9; 451/5; 451/41

(58) Field of Classification Search
CPC ...... G11B 5/127; G11B 5/1272; G11B 5/187; G11B 5/2651; G11B 5/295; G11B 5/48; G11B 7/00; G11B 7/005; G11B 7/22
USPC .................. 29/417, 603.07, 603.12–603.16, 29/603.18; 360/234.5–234.9; 451/5, 41
See application file for complete search history.

(56) References Cited

U.S. PATENT DOCUMENTS

| | | |
|---|---|---|
| 4,761,699 A | 8/1988 | Ainslie et al. |
| 4,789,914 A | 12/1988 | Ainslie et al. |
| 5,068,759 A | 11/1991 | Matsuzaki |
| 5,124,864 A | 6/1992 | Matsuzaki |
| 5,126,901 A | 6/1992 | Momoi et al. |
| 5,200,869 A | 4/1993 | Matsuzaki |
| 5,384,432 A | 1/1995 | Noro et al. |
| 5,530,604 A | 6/1996 | Pattanaik |

(Continued)

OTHER PUBLICATIONS

Notice of Allowance dated Dec. 20, 2011 from U.S. Appl. No. 12/612,575, 12 pages.

*Primary Examiner* — Paul D Kim

(57) ABSTRACT

A method for manufacturing a read head includes the step of depositing a conductive filler into a plurality of holes that extend through a wafer. Each of the holes extends from a wafer top surface to a wafer bottom surface. Each of the holes includes an inner surface that includes an insulative layer. The method further includes the steps of fabricating a read transducer on the wafer top surface, and depositing a plurality of electrically conductive leading connection pads on the wafer bottom surface. The plurality of electrically conductive leading connection pads are in electrical contact with the conductive filler.

7 Claims, 7 Drawing Sheets

(56) References Cited

U.S. PATENT DOCUMENTS

| | | |
|---|---|---|
| 5,896,248 A | 4/1999 | Hanrahan et al. |
| 5,914,834 A | 6/1999 | Gustafson |
| 6,125,014 A | 9/2000 | Riedlin, Jr. |
| 6,349,017 B1 | 2/2002 | Schott |
| 6,757,135 B2 | 6/2004 | Rancour et al. |
| 6,796,018 B1 | 9/2004 | Thornton |
| 6,947,258 B1 | 9/2005 | Li |
| 7,006,330 B1 | 2/2006 | Subrahmanyam et al. |
| 7,027,264 B1 | 4/2006 | Subrahmanyam et al. |
| 7,254,885 B2 | 8/2007 | Hipwell, Jr. et al. |
| 7,307,816 B1 | 12/2007 | Thornton et al. |
| 7,413,979 B2 * | 8/2008 | Rigg et al. ............ 438/667 |
| 7,535,676 B2 | 5/2009 | Lille |
| 7,929,248 B2 | 4/2011 | Zhu et al. |
| 8,012,804 B1 * | 9/2011 | Wang et al. ............ 438/110 |
| 8,164,858 B1 | 4/2012 | Moravec et al. |
| 8,418,353 B1 * | 4/2013 | Moravec et al. ........ 29/603.16 |
| 2006/0181808 A1 | 8/2006 | Shiraki et al. |
| 2007/0047144 A1 | 3/2007 | Oosawa |

\* cited by examiner

METHOD FOR MANUFACTURING A READ HEAD HAVING CONDUCTIVE FILLER IN INSULATED HOLE THROUGH SUBSTRATE

CROSS REFERENCE TO RELATED APPLICATIONS

This application is a divisional of U.S. patent application Ser. No. 12/612,575, filed on Nov. 4, 2009, now U.S. Pat. No. 8,164,858, which is hereby incorporated by reference in its entirety.

BACKGROUND OF THE INVENTION

1. Field of the Invention

The present invention relates generally to the field of information storage devices, and more particularly to head gimbal assemblies used in information storage devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, micro-actuation, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media. The typical read/write element requires four electrical connection terminals (i.e. so called "bond pads") on the read head. These four do not including any additional bond pads that may be required for the manufacture and/or testing of the read head, such as bond pads for an electrical lapping guide (ELG) on the read head to control lapping of the pole tips during manufacture.

The HGA typically also includes a suspension assembly with a laminated flexure to carry the electrical signals to and from the bond pads of the read head. The HGA, in turn, is a sub-component of a head stack assembly (HSA) that typically includes a plurality of HGAs, an actuator, and a flex cable. The plurality of HGAs is attached to various arms of the actuator, and each of the laminated flexures of the HGAs has a flexure tail that is electrically connected to the HSA's flex cable. Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that extend from adjacent the head and terminate at electrical connection points at the flexure tail. At the other end, the electrically conductive traces are electrically connected to a plurality of electrically conductive bonding pads on the head.

The industry trend towards increasing areal data density has necessitated, for certain disk drive products, that additional features be added to the read head. Each such additional feature requires electrical connection to additional bonding pads per read head. For example, a microactuator for fine tracking control may be added to the read head to increase servo bandwidth and thereby facilitate an increase in the data track density of the disk drive (typically measured in tracks per inch). A heater for flying height actuation may also be added to the read head to allow the separation between the read head and the disk media to be greater when not reading or writing (and thereby improving tribological performance of the read head), while causing thermal expansion that temporarily brings the read/write transducer closer to the disk media while reading and writing (and thereby obtain acceptable signal amplitude). Also, a touch-down sensor may be added to sense when the read head contacts the disk surface during operation.

However, in most applications, the head cannot be made larger to accommodate the additional bonding pads associated with such improvements. On the contrary, as a general trend, heads have become smaller for various important reasons (e.g. cost, dynamic response to mechanical shock, etc), and such trend is unlikely to reverse. Although some number of additional bonding pads might be accommodated by making the bonding pads smaller, the size of bonding pads in contemporary read/write heads has already been reduced to the point where electrical interconnect during manufacture has become challenging and difficult. Accordingly, there is a need in the art for HGA designs that can facilitate the practical electrical connection of conductive traces of the flexure to more bonding pads on the head.

SUMMARY

A novel read head is disclosed. The read head includes a substrate having a trailing face and a leading face opposite the trailing face. The substrate includes a first hole therethrough that extends continuously from the trailing face to the leading face. The read head also includes a read transducer disposed on the trailing face, and a first plurality of electrically conductive trailing connection pads disposed on the trailing face. A first insulative layer is disposed on an inner surface of the first hole. A first electrically conductive filler is disposed in the first hole but is insulated from the substrate by the first insulative layer. A first electrically conductive leading connection pad is disposed on the leading face and is electrically connected to the first conductive filler.

A novel method for fabricating a read head is also disclosed. The method includes depositing conductive filler into a plurality of holes that extend through a wafer, and fabricating a read transducer on the wafer top surface. Each of the holes extends from a wafer top surface to a wafer bottom surface. Each of the holes includes an inner surface that includes an insulative layer. The method also includes depositing a plurality of electrically conductive leading connection pads on the wafer bottom surface. The plurality of electrically conductive leading connection pads are in electrical contact with the conductive filler.

DETAILED DESCRIPTION OF EXEMPLARY EMBODIMENTS

Figure 1:
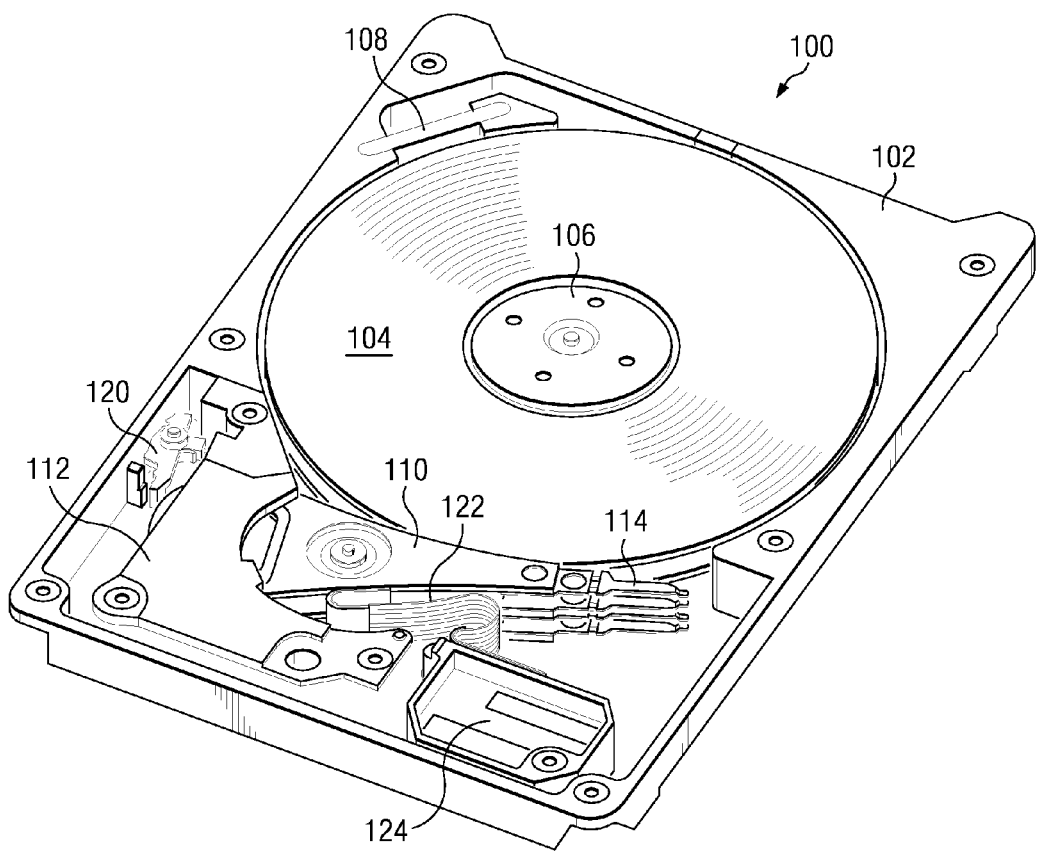
FIG. 1 is top perspective view of a disk drive capable of including an embodiment of the present invention.

FIG. 1 is top perspective view of a disk drive 100 capable of including an embodiment of the present invention. The disk drive 100 includes a disk drive base 102 and two annular magnetic disks 104. The disk drive 100 further includes a spindle 106, rotably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 110 that is rotably mounted on disk drive base 102. Voice coil motor 112 rotates the actuator 110 through a limited angular range so that at least one head gimbal assembly (HGA) is desirably positioned relative to one or more tracks of information on a corresponding one of the disks 104. The embodiment of FIG. 1 includes four HGAs 114, each of which corresponds to a surface of one of the two disks 104. However in other embodiments fewer or more HGAs may be included depending on the number of disks 104 that are included and whether the disk drive 100 is depopulated. Each HGA 114 includes a read head (not depicted in FIG. 1) for reading and writing data from and to one of the disks 104. The actuator 110 may occasionally be latched at an extreme angular position within the limited angular range, by latch 120. Electrical signals to/from the HGAs 114 are carried to other drive electronics via a flex cable 122 and flex cable bracket 124.

Figure 2:
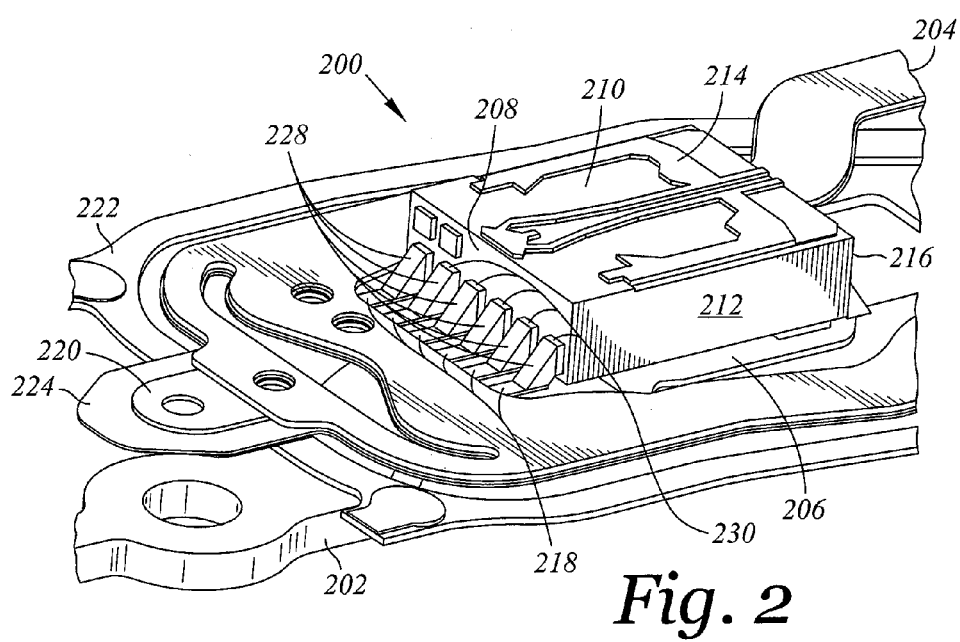
FIG. 2 is an exploded perspective view of the distal end of a head gimbal assembly (HGA) according to an embodiment of the present invention.

FIG. 2 is an exploded perspective view of the distal end of an HGA 200 according to an embodiment of the present invention. Now referring additionally to FIG. 2, the HGA 200 includes load beam 202 and a read head 210. The read head 210 includes a slider substrate 212 having a trailing face 208 and a leading face 216 opposite the trailing face 208. The slider substrate 212 preferably comprises AlTiC or silicon. The slider substrate 212 also includes an air bearing surface 214 that is substantially orthogonal to the trailing face 208, and that includes a read/write transducer (too small to be practically shown in the view of FIG. 2, but disposed on the trailing face 208). In certain embodiments, the read/write transducer is preferably an inductive magnetic write transducer merged with a magneto-resistive read transducer. The purpose of the load beam 202 is to provide vertical compliance for the read head 210 to follow vertical undulations of the surface of a disk (e.g. disk 104 of FIG. 1) as it rotates, and to preload the air bearing surface of the read head 210 against the disk surface by a preload force that is commonly referred to as the "gram load."

The HGA 200 also includes a laminated flexure 204 attached to the load beam 202. The head 210 is attached to a tongue 206 of the laminated flexure 204. A first purpose of the laminated flexure 204 is to provide compliance for the head 210 to follow pitch and roll angular undulations of the surface of the (e.g. disk 104) as it rotates, while restricting relative motion between the read head 210 and the load beam 202 in the lateral direction and about a yaw axis. A second purpose of the laminated flexure 204 is to provide a plurality of electrical paths to facilitate signal transmission to/from the read head 210.

For that second purpose, the laminated flexure 204 includes a plurality of electrically conductive traces 218 that are defined in an electrically conductive layer 220, and that are isolated from a support layer 222 by a dielectric layer 224 that is disposed between the support layer 222 and the electrically conductive layer 220. The plurality of electrically conductive traces 218 of the flexure 204 are electrically connected to a first plurality of electrically conductive trailing connection pads 230 on the trailing face 208 of the read head 210, by a plurality of 90° bonds 228.

In the embodiment of FIG. 2, the first plurality of electrically conductive trailing connection pads 230 preferably comprises copper or gold. The plurality of 90° bonds 228 preferably comprises solder or gold. The conductive traces 218 may comprise copper, the support layer 222 may comprise stainless steel and/or another suitable structural material, and the dielectric layer 224 may comprise polyimide, for example. In certain embodiments, the electrically conductive layer 220 comprises a copper layer having a thickness that is at least 5 microns but no more than 15 microns. In various regions of the laminated flexure 204, one or more of the layers may be absent (e.g. removed by etching).

Figure 3A:
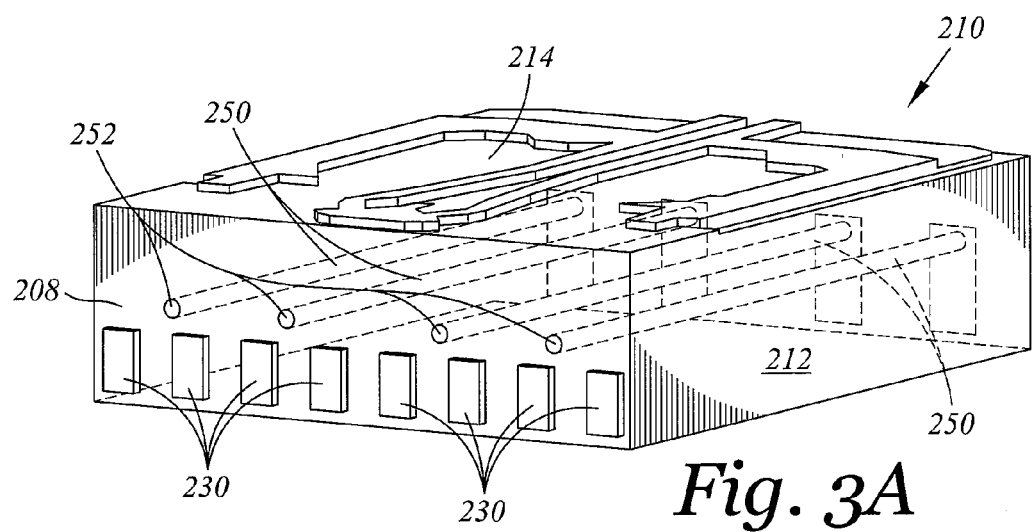
FIG. 3A is a back perspective view of read head, according to an embodiment of the present invention.
Figure 3B:
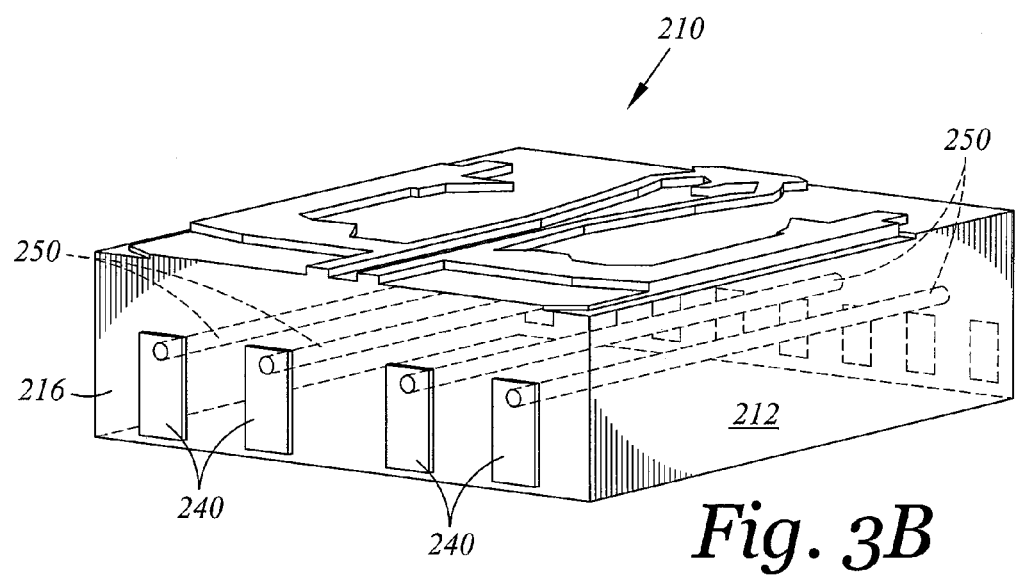
FIG. 3B is a front perspective view of the read head of FIG. 3A.

FIG. 3A is a back perspective view of the read head 210, according to an embodiment of the present invention. FIG. 3B is a front perspective view of the read head 210. Now referring additionally to FIGS. 3A and 3B, the read head 210 includes a first plurality of electrically conductive trailing connection pads 230 on its trailing face 208. The slider substrate 212 includes a plurality of holes 250 therethrough, each extending continuously from the trailing face 208 to the leading face 216. In the embodiment of FIGS. 3A and 3B, each of the plurality of holes 250 defines a hole longitudinal axis that is normal to the trailing face 208. Preferably, each of the plurality of holes 250 defines a hole diameter in the range 10 μm to 100 μm. In the embodiment of FIGS. 3A and 3B, the length of each hole 250 is approximately equal to a distance between the leading face 216 and the trailing face 208, measured normal to the trailing face 208.

In the embodiment of FIGS. 3A and 3B, each of the plurality of holes 250 contains an electrically conductive filler 252 that is insulated from the slider substrate 212 by an insulative layer. The insulative layer is too thin to be clearly shown in FIGS. 3A and 3B, but it is disposed on the inner surface of each hole (as will be shown and described later herein). Preferably, the electrically conductive filler 252 comprises an electrically conductive material having a low coefficient of thermal expansion (e.g. tantalum), and/or an electrically conductive material (e.g. TiC) having a coefficient of thermal expansion that may be similar to that of the slider substrate 212.

As is shown in FIGS. 3A and 3B, the read head 210 also includes a first plurality of electrically conductive leading connection pads 240 disposed on the leading face 216 of the slider substrate 212, and each of the first plurality of electrically conductive leading connection pads 240 is connected to the electrically conductive filler 252 of a respective hole 250.

Figure 4A:
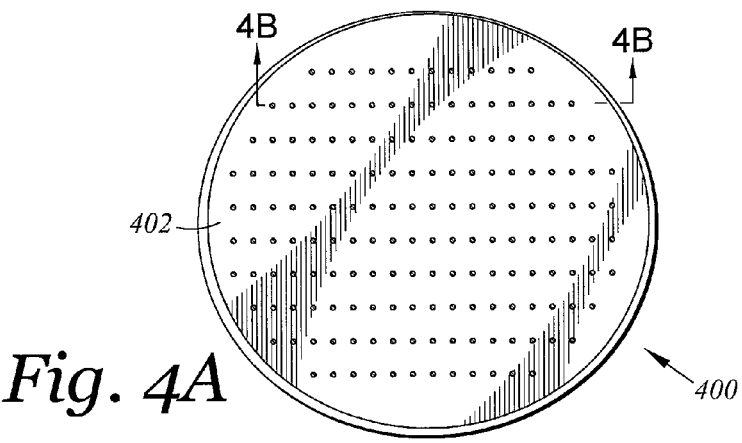
FIG. 4A is a top view of a wafer shown during the manufacture of read heads according to an embodiment of the present invention.
Figure 4B:
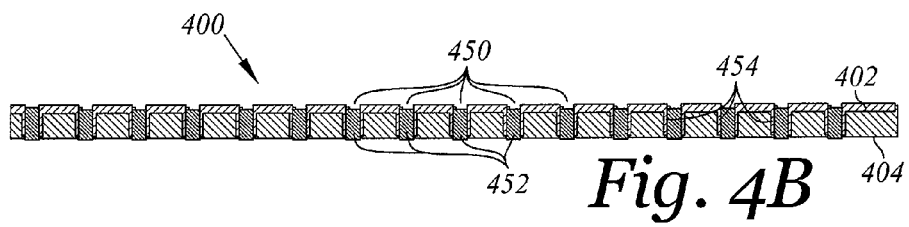
FIG. 4B is a side cross-sectional view of the wafer of FIG. 4A.

FIG. 4A is a top view of a wafer 400 shown during the manufacture of read heads according to an embodiment of the present invention. FIG. 4B is a side cross-sectional view of the wafer 400. The number and step density of features shown on the wafer 400 has been reduced in FIGS. 4A and 4B, so that the spacing between features may be artificially large and/or the size of features may be artificially large, for clarity of illustration. The water 400 includes a wafer top surface 402, and an opposing wafer bottom surface 404. A plurality of holes 450 is created through the wafer 400, for example by laser drilling, ultrasonic drilling and/or a plurality of pins in the wafer mold. A water jet may also be used to create the holes, alone or in conjunction with another form of drilling. Each hole 450 extends through the wafer 400 from the wafer top surface 402 to the wafer bottom surface 404. Preferably, each of the plurality of holes 450 defines a hole diameter in the range 10 μm to 100 μm. The wafer 400 preferably comprises AlTiC because that material has desired properties as the slider substrate for read heads (that are ultimately diced apart from the wafer sometime after a merged or read transducer is fabricated on the wafer top surface 402).

An insulative layer 454 is formed on an inner surface of each of the plurality of holes 450, for example by high temperature annealing of the AlTiC wafer substrate (e.g. preferably to create an insulative titanium oxide layer having a thickness in the hole in the range 10 to 20 angstroms), and/or by atomic layer deposition (ALD) of aluminum oxide (e.g. preferably to a thickness in the hole in the range 0.05 microns to 0.1 microns). In certain alternative embodiments, if the wafer substrate material is silicon, then a silicon oxide insulative layer may be thermally grown on the substrate (and in the hole) by conventional methods. The insulative layer may also comprise magnesium oxide and/or other insulative oxides or insulative materials. Note that, herein, if/when more than one insulative layer is disposed between a conductive structure and the substrate, then each of the insulative layers is said to be insulating that conductive structure from the substrate.

Electrically conductive filler 452 is deposited into the plurality of holes 450 that extend through the wafer 400. In certain embodiments, the electrically conductive filler 452 preferably comprises an electrically conductive material such as TiC that has a coefficient of thermal expansion (CTE) that approximately matches the CTE of the wafer substrate material. In certain other embodiments, the electrically conductive filler 452 may preferably comprise a conductive metal that has a relatively low CTE such as tantalum. Alternatively, other conductive metals (e.g. gold or copper) may be used. In certain embodiments, after filling the holes 450 with the conductive filler 452, the wafer may be fired to bind or adhere the conductive filler 452 to the inside of the insulated holes 450 and/or to bind grains or particles of the conductive filler 452 to each other to form bound conductive studs through the insulated holes 450.

Figure 5A:
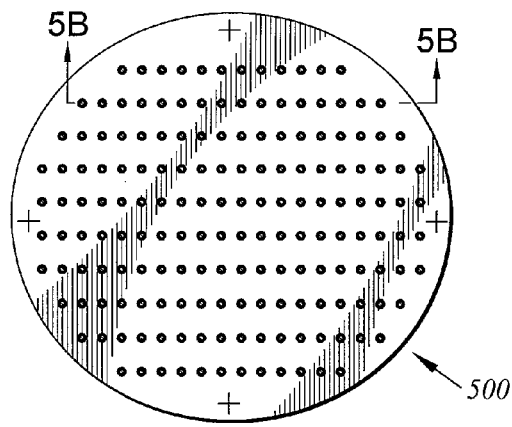
FIG. 5A is a top view of a wafer shown during the manufacture of read heads according to an embodiment of the present invention.
Figure 5B:
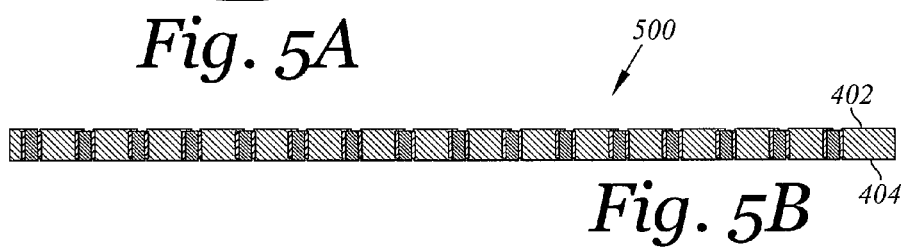
FIG. 5B is a side cross-sectional view of the wafer of FIG. 5A.

FIG. 5A is a top view of a wafer shown during the manufacture of read heads according to an embodiment of the present invention. FIG. 5B is a side cross-sectional view of the wafer of FIG. 5A. As with the preceding figures, the number and step density of features shown on the wafer 500 has been reduced in FIGS. 5A and 5B, so that the spacing between features may be artificially large and/or the size of features may be artificially large, for clarity of illustration.

The wafer 500 of FIGS. 5A and 5B is in a more advanced stage of manufacture than the wafer 400 of FIGS. 4A and 4B, because it is shown after the wafer 400 has been lapped by conventional lapping methods to polish and planarize the wafer top surface 402 (and, optionally, the wafer bottom surface 404 also).

Figure 6A:
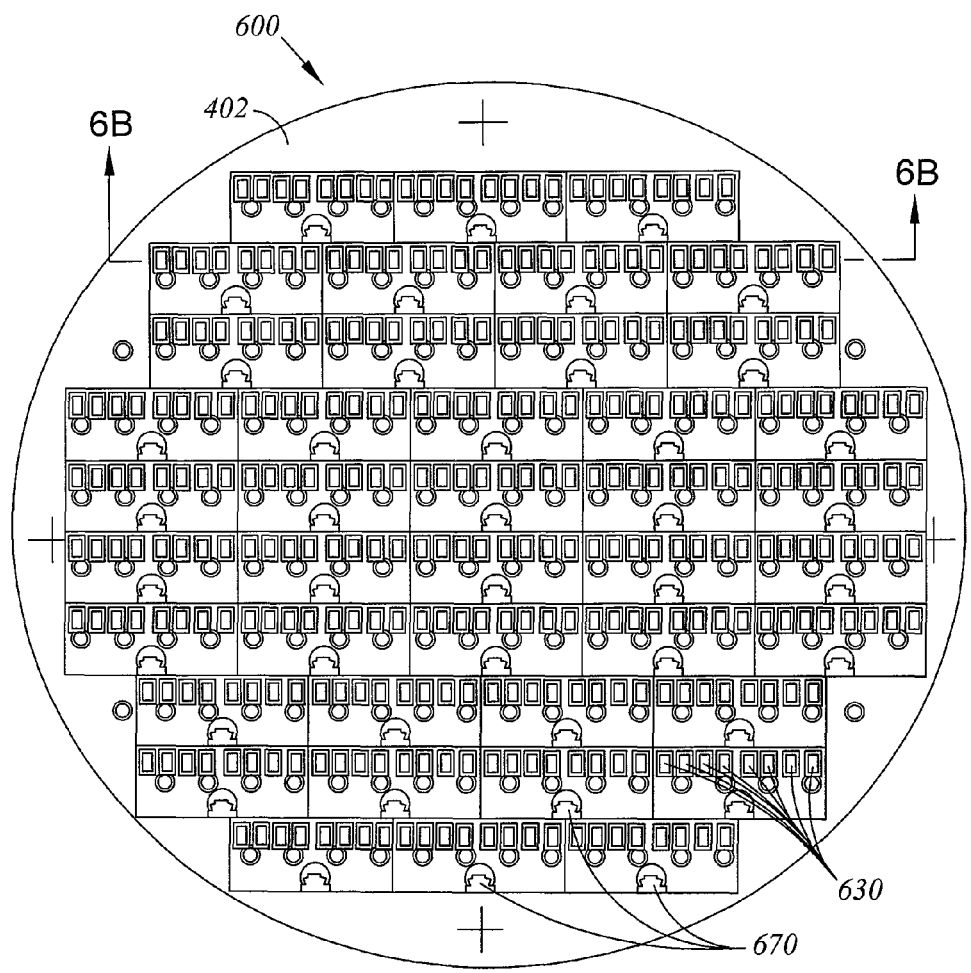
FIG. 6A is a top view of a wafer according to an embodiment of the present invention, after the conventional fabrication of read/write transducers.
Figure 6B:
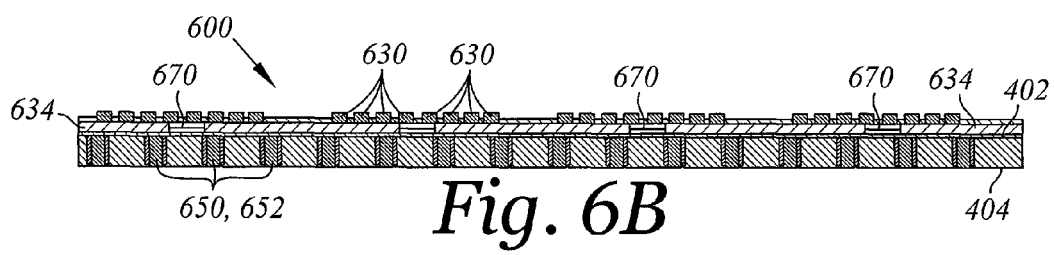
FIG. 6B is a side cross-sectional view of the wafer of FIG. 6A.

After lapping, the wafer top surface 402 is subjected to the various conventional deposition, masking, and etching steps required to fabricate read/write transducers. For example, FIGS. 6A and 6B depict a wafer 600 according to an embodiment of the present invention, after the conventional fabrication of read/write transducers 670. As in conventional read heads, each of the read/write transducers 670 may be electrically connected to a plurality of electrically conductive trailing connection pads 630. However, unlike in conventional read heads, the top surface 402 of wafer 600 may accommodate additional devices for each read head (e.g. a microactuator, heater for dynamic flying height control, touch-down sensor, and/or electric lapping guide, etc) because such additional devices (and/or conductors of the read write transducer 670 itself) may be electrically connected to the conductive studs 652 through the insulated holes 650 rather than only to the plurality of electrically conductive trailing connection pads 630.

Note that in the embodiment of FIG. 6B, the plurality of electrically conductive trailing connection pads 630 are insulated from the wafer top surface 402 (which becomes the trailing face of each read head) by a trailing face insulative layer 634. However, trailing face insulative layer 634 may be patterned by conventional methods when deposited, to allow electrical connections to be made to the read write transducer 670, and the conductive studs 652, as desired.

Next, back-grinding of the wafer bottom surface 404 may be optionally accomplished to significantly reduce the wafer thickness, if it is desired to shorten the length of the manufactured read heads to be less than the starting wafer thickness. For example, back-grinding of the wafer bottom surface 404 may reduce an overall thickness of the wafer 600 by at least 300 μm. Hence, in certain embodiments of the present invention, the length of each of the plurality of holes 650 when created (e.g. drilled) and when insulated, may be significantly greater than the length of each of the plurality of electrically conductive studs 652 and insulated holes 650 through the length of each finally manufactured read head. In this regard, each of the plurality of insulated holes 650 preferably defines a hole length in the range 500 μm to 1300 μm, depending on the preferred thickness of the wafer during fabrication of the read/write transducers 670, and depending on the preferred length of the finished read heads. In certain embodiments, the hole length is preferably approximately 1235 μm. In certain other embodiments, the hole length (e.g. after optional back-grinding) preferably may be approximately 850 μm. After optional backgrinding, the wafer bottom surface 404 may be polished.

Figure 7A:
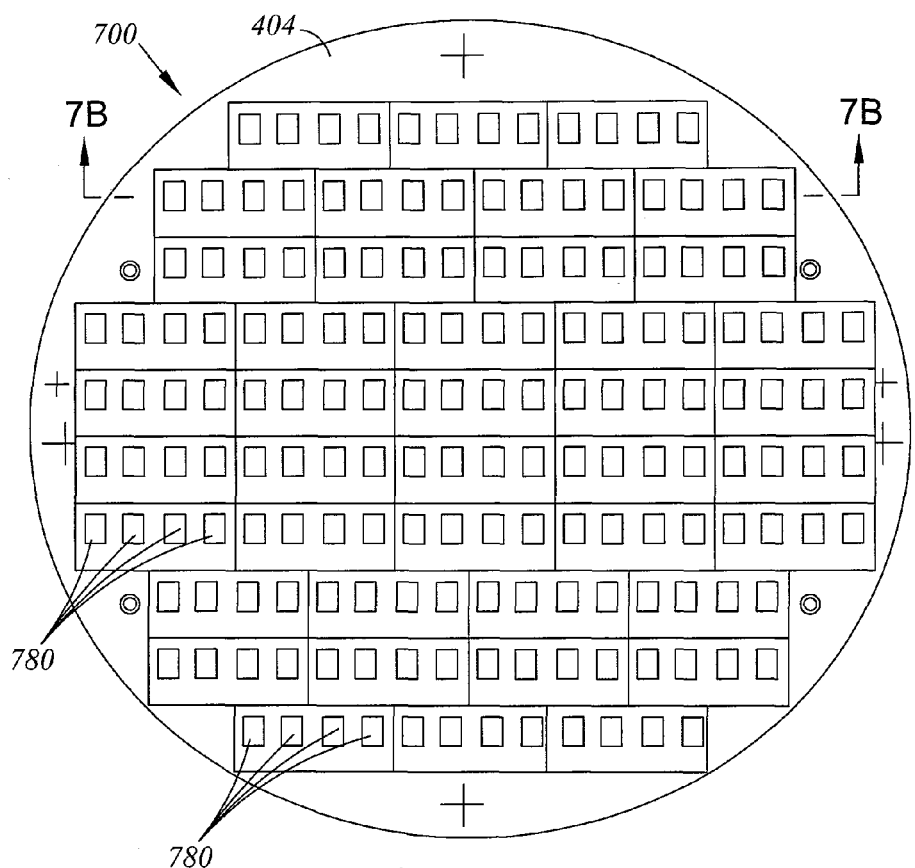
FIG. 7A is a top view of a wafer shown during the manufacture of read heads according to an embodiment of the present invention.
Figure 7B:
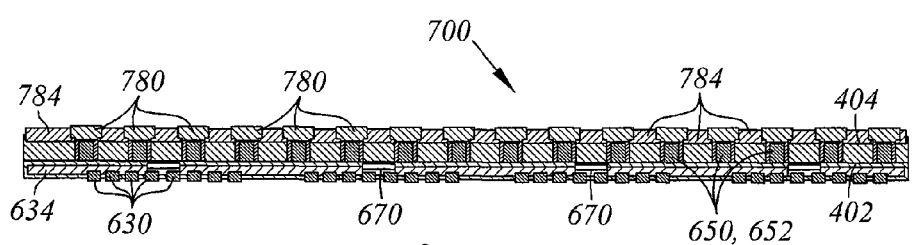
FIG. 7B is a side cross-sectional view of the wafer of FIG. 7A.

FIG. 7A is a top view of a wafer shown during the manufacture of read heads according to an embodiment of the present invention. FIG. 7B is a side cross-sectional view of the wafer of FIG. 7A. As with the preceding figures, the number and step density of features shown on the wafer 700 has been reduced in FIGS. 7A and 7B, so that the spacing between features may be artificially large and/or the size of features may be artificially large, for clarity of illustration.

The wafer 700 of FIGS. 7A and 7B is depicted in a more advanced stage of manufacture than the wafer 600 of FIGS. 6A and 6B, because it is shown with a plurality of electrically conductive leading connection pads 780 disposed on the wafer bottom surface 404 (which becomes the leading faces of the read heads). In the embodiment of FIG. 7B, it can be seen that each of the plurality of electrically conductive leading connection pads 780 is electrically connected to a respective one of the plurality of electrically conductive studs 652 (which correspond to the electrically conductive filler filling each of the plurality of insulated holes 650). Also in the embodiment of FIG. 7B, each of the electrically conductive leading connection pads 780 is insulated from the wafer bottom surface 404 (which becomes the leading faces of the read heads) by a leading face insulative layer 784. This may serve to prevent shorting between the electrically conductive leading connection pads 780 through the wafer substrate. Preferably, the leading face insulative layer 784 is deposited on the wafer bottom surface 404 as a bottom surface insulative layer that is patterned so that the conductive filler/studs 652 are exposed, before depositing the plurality of electrically conductive leading connection pads 780. For example, regions of the leading face insulative layer 784 that overlie the conductive filler/studs 652 may be opened using wet etch or ion milling. Preferably but not necessarily, each of the electrically conductive leading connection pads 780 may be fabricated by first depositing a patterned seed layer (e.g. copper underlayer) and then depositing a patterned pad material (e.g. gold coating) upon the seed layer.

Figure 8:
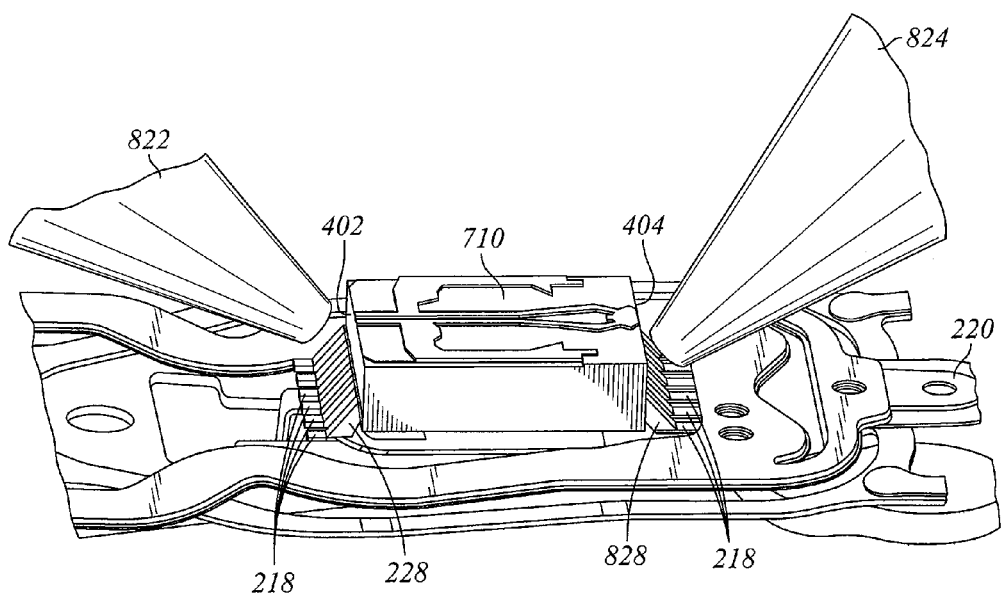
FIG. 8 is a side perspective view of an HGA according to an embodiment of the present invention, shown during HGA assembly.

FIG. 8 is a side perspective view of an HGA according to an embodiment of the present invention, shown during HGA assembly. FIG. 8 depicts the electrical connection of a plurality of electrically conductive traces 218 (that are defined in an electrically conductive layer 220 of a laminated flexure 204) to the plurality of electrically conductive leading connection pads 780 and to the plurality of electrically conductive trailing connection pads 630 of a head 710. The head 710 may have been among a plurality of read heads cut from the wafer 700, for example.

The electrical connections 228 between the plurality of electrically conductive trailing connection pads 630 and the plurality of electrically conductive traces 218, and the electrical connections 828 between the plurality of electrically conductive leading connection pads 780 and the plurality of electrically conductive traces 218, may be made by solder jet bonding, ultrasonic gold ball bonding, ultrasonic wedge bonding, solder bump bonding, or reflow soldering, for example. FIG. 8 depicts a bonding tip 822 creating the electrical connections 228 between the plurality of electrically conductive trailing connection pads 630 and the plurality of electrically conductive traces 218. Bonding tip 824 creates the electrical connections 828 between the plurality of electrically conductive leading connection pads 780 and the plurality of electrically conductive traces 218. In the embodiment of FIG. 8, the bonding tips 822 and 824 may be conventional bonding tips for solder jet bonding, for ultrasonic gold ball bonding, for ultrasonic wedge bonding, or for another conventional method to create 90° electrical connections.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A method for manufacturing a read head, the method comprising:
   depositing a conductive filler into a plurality of holes that extend through a wafer, each of the holes extending from a wafer top surface to a wafer bottom surface, each of the holes including an inner surface that includes an insulative layer;
   fabricating a read transducer on the wafer top surface;
   depositing a plurality of electrically conductive leading connection pads on the wafer bottom surface, the plurality of electrically conductive leading connection pads being in electrical contact with the conductive filler.

2. The method of claim 1 further comprising cutting the wafer into a plurality of read heads.

3. The method of claim 1 wherein fabricating the read transducer includes depositing a top surface insulative layer on the wafer top surface.

4. The method of claim 1 further comprising grinding the wafer bottom surface to reduce an overall thickness of the wafer by at least 300 μm.

5. The method of claim 4 further comprising depositing a bottom surface insulative layer on the wafer bottom surface, and then patterned the bottom surface insulative layer the conductive filler is exposed, before depositing the plurality of electrically conductive leading connection pads thereon.

6. The method of claim 5 wherein depositing the plurality of electrically conductive leading connection pads comprises depositing a seed layer and then plating pad material upon the seed layer.

7. The method of claim 1 further comprising heating the wafer to adhere the conductive filler within the plurality of holes.

* * * * *